United States Patent
Yang et al.

(10) Patent No.: US 8,332,713 B2
(45) Date of Patent: Dec. 11, 2012

(54) COMMUNICATION METHOD USING CODE PACKET IN WIRELESS NETWORK

(75) Inventors: Sung Bo Yang, Seoul (KR); June-Koo Rhee, Daejeon (KR); YongHwan Bang, Daejeon (KR); DooJung Lee, Seoul (KR)

(73) Assignees: Hyundai Motor Company, Seoul (KR); Kaist

( * ) Notice: Subject to any disclaimer, the term of this patent is extended or adjusted under 35 U.S.C. 154(b) by 322 days.

(21) Appl. No.: 12/722,077

(22) Filed: Mar. 11, 2010

(65) Prior Publication Data
US 2010/0235703 A1    Sep. 16, 2010

(30) Foreign Application Priority Data

Mar. 13, 2009    (KR) .................. 10-2009-0021681

(51) Int. Cl.
*G08C 25/02*    (2006.01)
*H04L 1/18*    (2006.01)
(52) U.S. Cl. ....................... 714/749; 714/748
(58) Field of Classification Search .................. None
See application file for complete search history.

(56) References Cited

U.S. PATENT DOCUMENTS

| | | | |
|---|---|---|---|
| 5,870,412 A | 2/1999 | Schuster et al. | |
| 7,532,621 B2 | 5/2009 | Birman et al. | |
| 2009/0144597 A1 | 6/2009 | Xue et al. | |
| 2009/0193314 A1 | 7/2009 | Melliar-Smith et al. | |

FOREIGN PATENT DOCUMENTS

| | | |
|---|---|---|
| KR | 1020000025436 | 5/2000 |
| KR | 1020080047263 | 5/2008 |

*Primary Examiner* — Guerrier Merant
(74) *Attorney, Agent, or Firm* — Edwards Wildman Palmer LLP; Peter F. Corless

(57) ABSTRACT

The present invention, in preferred aspects, provides a communication method using a network coding packet in a wireless network, with reduced occurrence of negative acknowledgements, between a access point and plural mobile terminals. In preferred embodiments of the present invention, a communication method using a network coding packet in a wireless network comprises: (a) transmitting plural downlink multicast packets, each containing serial numbers of packets, to the first and second mobile terminals sequentially; (b) receiving a first negative acknowledgement from the first mobile terminal; (c) receiving a second negative acknowledgement from the first mobile terminal or the second negative acknowledgement skipping the first negative acknowledgement on occurrence of the first packet error at the second mobile terminal; and (d) transmitting a restoration packet containing exclusive OR packet of all errored packets in the restoration period defined in reference to the second negative acknowledgement from the first and second mobile terminals.

5 Claims, 4 Drawing Sheets

COMMUNICATION METHOD USING CODE PACKET IN WIRELESS NETWORK

CROSS-REFERENCE(S) TO RELATED APPLICATION

This application claims under 35 U.S.C. §119(a) the benefit of Korean Patent Application No. 10-2009-0021681 filed Mar. 13, 2009, the entire contents of which are incorporated herein by reference.

FIELD OF THE INVENTION

The present invention relates, generally, to a communication method using a network coding packet between a mobile terminal and a access point in a wireless network.

BACKGROUND

A sequence chart that shows an exemplary prior art of a network coding packet communication system in a wireless network is shown in FIG. 1.

In conventional systems to provide multicast communications, referring for example to FIG. 1, a first mobile terminal ST1 receives multicast data with a access point in the conventional packet communication method, and a second mobile terminal ST2 also receives the same multicast data access point. Accordingly, when the first mobile terminal ST1 transmits an uplink packet to the access point, the access point as well as the second mobile terminal ST2 suitably receives the uplink packet from the first mobile terminal ST1. Likewise, if the access point suitably transmits a downlink multicast packet to the first mobile terminal ST1, both the first mobile terminal ST1 and the second mobile terminal ST2 receives the downlink packet.

In reference to FIG. 1, if the first mobile terminal ST1 does not receive a downlink multicast packet (hereinafter, referred as to a first packet error) from the access point because of a temporary communication problem, the first mobile terminal ST1 transmits a first negative acknowledgement responsive to the first packet error. Preferably, the first negative acknowledgement means that the first mobile terminal ST1 does not receive the first packet normally. Further, the access point receives the first negative acknowledge message, transmitted from the first mobile terminal ST1, in response to the first packet error, and stores the first packet and its sequence number an additional memory device.

The first negative acknowledgement is also delivered to the second mobile terminal ST2. It is assumed that the second mobile terminal ST2 normally receives the first packet from the access point though the first mobile terminal ST1 does not receive the first packet because of a temporary communication problem.

A second packet as another downlink multicast packet from the access point is normally transmitted to the first and second mobile terminals ST1 and ST2.

Further, if the second mobile terminal ST2 does not receive another downlink multicast packet (hereinafter, referred as to a third packet) from the access point because of a temporary communication problem, the second mobile terminal ST2 suitably transmits a negative acknowledgement responsive to the third packet error. Preferably, the access point suitably receives the negative acknowledge message, transmitted from the second mobile terminal ST2, in response to the packet error of the third packet, and stores the third packet and its sequence number in an additional memory device.

Preferably, the negative acknowledgement suitably generated by the second mobile terminal ST2 is also delivered to the first mobile terminal ST1. It is assumed that the first mobile terminal ST1 normally receives the third packet from the access point though the second mobile terminal ST2 does not suitably receive the third packet because of a temporary communication problem.

Regarding of a fourth packet from the access point, the first mobile terminal ST1 suitably transmits a negative acknowledgement to the access point. In the case of a fifth packet from the access point, the second terminal ST2 suitably transmits a negative acknowledgement to the access point.

Referring to FIG. 1, the first and the second mobile terminals ST1 and ST2 normally receive a sixth packet and an eighth packet from the access point. However, in a seventh packet from the access point, the first and the second mobile terminals ST1 and ST2 independently transmit a negative acknowledgement to the access point. In the case of a ninth packet from the access point, the first mobile terminal ST1 does not receive normally and then does transmit a negative acknowledgement to the access point but the second mobile terminal ST2 receives normally.

At set-up time, i.e., after transmitting a first to a ninth packets and receiving a feedback in response to the first to the ninth packets, the access point makes a packet set for restoration based on the feedback such as plural negative acknowledgements and transmits the packet set to the first and second mobile terminals ST1 and ST2. Herein, the packet set for restoration enables the first and second mobile terminals ST1 and ST2 to restore a downlink packet in response to a negative acknowledgement. The packet set for restoration is provided in a first case that the first and second mobile terminals ST1 and ST2 independently transmits different negative acknowledgements in response to different downlink packets or in a second case that the first and second mobile terminals ST1 and ST2 independently transmits negative acknowledgements in response to the same downlink packets.

Referring to FIG. 1, the access point transmits a first restoration packet ($1 \oplus 3$) to the first and second mobile terminal ST1 and ST2, based on the first negative acknowledgements independently generated responsive to the first and third packets. The first restoration packet ($1 \oplus 3$) includes a result of logic XOR operation to the first and third packets. The first packet set is relevant to the first cast that the first and second mobile terminals ST1 and ST2 independently transmits different negative acknowledgements in response to different downlink packets. Responsive to the first restoration packet ($1 \oplus 3$), the first mobile terminal ST1 performs a logic operation, e.g., (($1 \oplus 3$)$\oplus 3$), to the first restoration packet ($1 \oplus 3$) and the third packet already received from the access point in order to restore the first packet not received normally from the access point. Meanwhile, the second mobile terminal ST2 performs a logic operation, e.g., (($1 \oplus 3$)$\oplus 1$), to the first restoration packet ($1 \oplus 3$) and the first packet already received from the access point in order to restore the third packet not received normally from the access point.

Based on the second negative acknowledgements independently generated responsive to the fourth and fifth packets, the access point transmits a fourth restoration packet ($4 \oplus 5$) to the first and second mobile terminal ST1 and ST2. The fourth restoration packet ($4 \oplus 5$) includes a result of logic XOR operation to the fourth and fifth packets. The fourth packet set is also relevant to the first cast that the first and second mobile terminals ST1 and ST2 independently transmits different negative acknowledgements in response to different downlink packets. Responsive to the fourth restoration packet ($4 \oplus 5$), the first mobile terminal ST1 performs a logic operation, e.g., $((4\oplus5)\oplus5)$, to the fourth restoration packet $(4\oplus5)$ and the fifth packet already received from the access point in order to restore the first packet not received normally from the access point. Meanwhile, the second mobile terminal ST2 performs a logic operation, e.g., $((4\oplus5)\oplus4)$, to the fourth restoration packet $(4\oplus5)$ and the fourth packet already received from the access point in order to restore the third packet not received normally from the access point.

In response to third negative acknowledgements from the first and second mobile terminals ST1 and ST2, the access point transmits a restoration packet, i.e., a seventh packet. In this case, the access point re-sends the seventh packet because both the first and second mobile terminals ST1 and ST2 do not receive the seventh packet normally. The first mobile terminal ST1 receives the seventh packet to recover the seventh packet not received normally before the set-up time. Receiving the restoration packet, the second mobile terminal ST2 also restores the seventh packet not received before the set-up time.

The access point transmits the ninth packet again to the first and second mobile terminals ST1 and ST2 because of the fourth negative acknowledgement delivered from the first mobile terminal ST1. This case is not included in the first or second case, but the fourth negative acknowledgement is a kind of remaining negative acknowledgement delivered before the set-up time. Accordingly, the access point re-sends the ninth packet for restoration. Then, the first mobile terminal ST1 receives the ninth packet to recover the ninth packet not received normally before the set-up time.

In the conventional code packet communication system, the access point receives a negative acknowledgement responsive to a multicast downlink packet and transmits a packet set to the first and second mobile terminals ST1 and ST2. Accordingly, the packet set enables both the first and second mobile terminals ST1 and ST2 to restore the multicast downlink packet. That is, the access point does not make a packet set separately used in the first and second mobile terminals ST1 and ST2 for a restoration process.

Preferably, the conventional packet communication system may simplify the restoration process because the access point suitably transmits a data for restoration to both the first and second mobile terminals ST1 and ST2 at a time.

However, in the conventional code packet communication system, the first and the second mobile terminals ST1 and ST2 individually transmit a negative acknowledgement to the access point every time a downlink multicast packet is not normally received. Accordingly, under a wireless network having high fraction lost, a negative acknowledgement often occurs so that obstacle or problem such as a collision between negative acknowledgements can be generated and a bandwidth in a wireless network may decrease. Further, the access point in the wireless network should store the negative acknowledgement delivered from mobile terminals so that an additional memory device is required.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention provides a communication method using a network coding packet in a wireless network, which reduces occurrences of negative acknowledgements and restoration packets transmissions between a access point and plural mobile terminals.

In a preferred embodiment of the present invention, a communication method using a code packet in a wireless network preferably comprises: (a) transmitting packets having serial numbers to first and second mobile terminals; (b) receiving a first negative acknowledgement from the first mobile terminal; (c) receiving a second negative acknowledgement from the first mobile terminal or the second negative acknowledgement skipping the first negative acknowledgement from the second mobile terminal; and (d) transmitting a restoration packet generated from the first serial number to the serial number immediately prior to the packet serial number of the second negative acknowledgement from the first or second mobile terminals.

In certain preferred embodiments, the communication method further comprises a step (e) after (d) step, preferably setting a restoration period as a first restoration period about previous serial numbers of a multicast packet responsive to the second negative acknowledgement and as a second restoration period about serial numbers of a multicast packet responsive to the second negative acknowledgement, wherein the multicast packet responsive to the second negative acknowledgement preferably recognizes an initial negative acknowledgement of the second restoration period.

In certain preferred embodiments, for example wherein the (c) step is not performed until a number of packets are suitably transmitted after the (b) step, the communication method further comprises step (d-1), comprising transmitting the restoration packet generated in reference to serial numbers of the multicast packets to the first and second mobile terminals.

According to further embodiments of the invention, in the (b) or (c) step, the first and second mobile terminals may not receive a suitable multicast packet, and may receive a negative acknowledgement responsive to the multicast packet from one of the first and second mobile terminals based on a random transmission time set up in the first and second mobile terminals.

In further preferred embodiments of the invention, when a third mobile terminal joins in the multicast group, the third mobile terminal preferably adds an identifier to a negative acknowledgement and transmits the negative acknowledgement containing the identifier to the access point if the negative acknowledgement initially occurred after the third mobile terminal has joined.

Even though the aforementioned summary of the present invention uses an example case of two mobile terminals for the sake of simplicity to explain the nature of the invention, it will be apparent to those skilled in the art that the present method can be extended with a large number of plural mobile terminals without any difficulty.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

Figure 1:
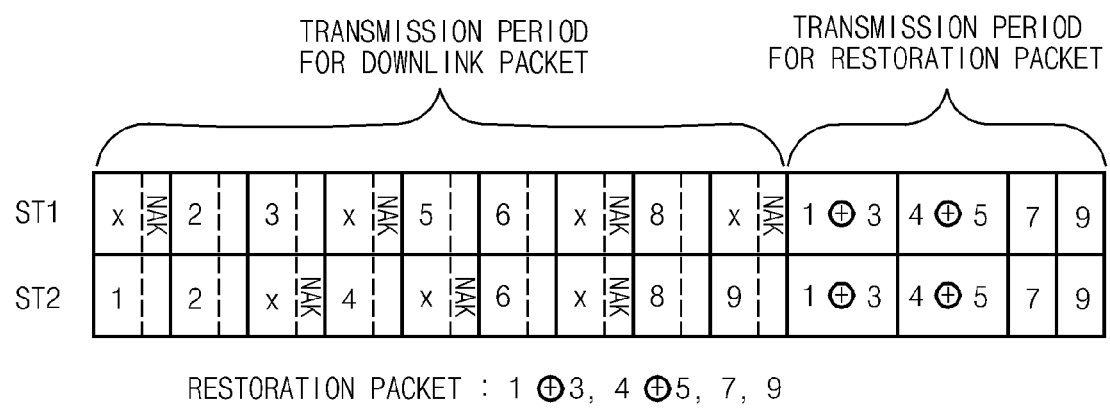
FIG. 1 is a sequence chart for showing a conventional network coding packet communication system in a wireless network.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

As described herein, the present invention includes a communication method using a network coding packet in a wireless network, comprising (a) transmitting packets having serial numbers to a first and a second mobile terminal, (b) receiving a first negative acknowledgement from the first mobile terminal, (c) receiving a second negative acknowledgement from the first mobile terminal or a second negative acknowledgement from the second mobile terminal, where the first negative acknowledgement of the second mobile terminal is not transmitted, (d) transmitting a restoration packet to the first and second mobile terminals.

In one embodiment, the restoration packet is generated from a first serial number to previous serial numbers of a multicast packet responsive to the second negative acknowledgement.

In another embodiment, the method further comprises a step (e) after (d) step, setting restoration period as a first restoration period about previous serial numbers of a multicast packet responsive to the second negative acknowledgement and as a second restoration period about serial numbers of a multicast packet responsive to the second negative acknowledgement, wherein the multicast packet responsive to the second negative acknowledgement recognizes an initial negative acknowledgement of the second restoration period.

In another further embodiment, the method further comprises in the case that the (c) step is not performed until a predetermined? number of packets are transmitted after the (b) step, a step (d-1) transmitting the restoration packet generated by serial numbers of the predetermined number of packets to the first and second mobile terminals.

In still another further embodiment of the claimed method, wherein in the (b) or (c) step, if both the first and second mobile terminals do not receive a multicast packet normally, receiving a negative acknowledgement responsive to the multicast packet from one of the first and second mobile terminals based on a random transmission time set up in the first and second mobile terminals.

In still another further embodiment of the method, when a third mobile terminal except for the first and second mobile terminals joins in the multicast group, the third mobile terminal adds an identifier to a negative acknowledgement and transmitting the negative acknowledgement containing the identifier to a access point if the negative acknowledgement is initially occurred after the third mobile terminal intervenes.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

Figure 2:
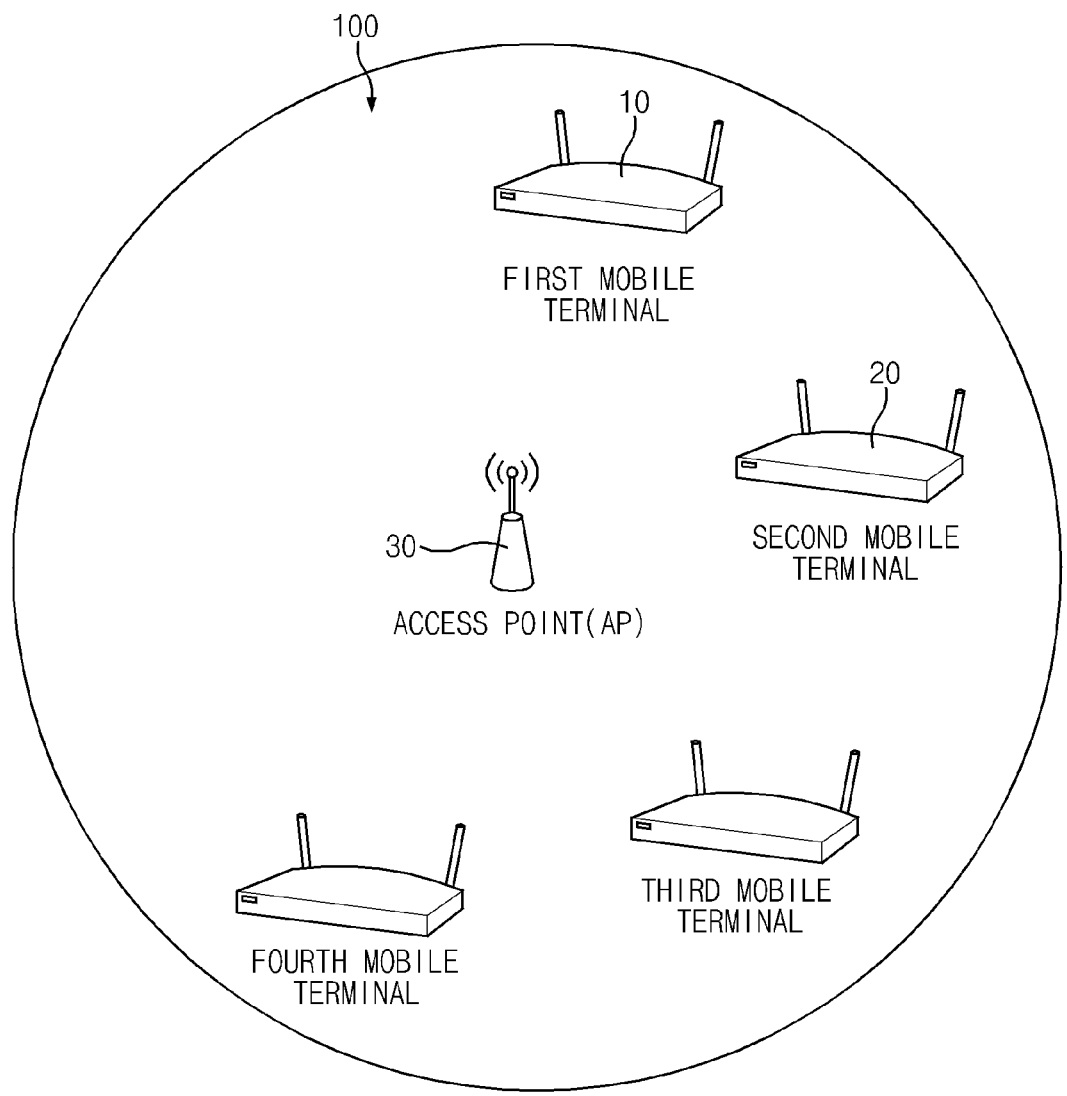
FIG. 2 is a diagram showing an exemplary communication system in a wireless network according to an embodiment of the present invention.

FIG. 2 is a diagram showing a communication system 100 in a wireless network according to an embodiment of the present invention.

According to certain exemplary embodiments, and as shown in FIG. 2, the communication system 100 preferably comprises a first mobile terminal 10, a second mobile terminal 20, and a access point 30. Preferably, the access point 30 includes an access point AP which is a specially configured node on a wireless network. Preferably, the access point can act as a central transmitter and receiver of wireless signals. Herein, the first mobile terminal 10, the second mobile terminal 20, and the access point 30 are all suitably coupled via the same wireless channel, and the first and second mobile terminals 10 and 20 are located within wireless communication coverage of the access point 30. Accordingly, if the first mobile terminal 10 transmits any packet to the access point 30, the second mobile terminal 20 can receives the packet delivered from the first mobile terminal 10 to the access point 30. Likewise, if the second mobile terminal 20 transmits any packet to the access point 30, the first mobile terminal 10 can receives the packet delivered from the second mobile terminal 20 to the access point 30.

According to further preferred embodiments of the present invention, the access point 30 comprises a coding block, not shown in figures, for suitably performing a logic XOR operation to downlink packets to generate a restoration packet, a transmission module for communicating data such as a packet with the first and second mobile terminals 10 and 20, and a control block, not shown in figures, for controlling internal operations. Further, the first and second mobile terminals 10 and 20 individually comprise a control block, not shown in figures, for suitably checking whether a packet is received or not, and generating a negative acknowledgement if the packet is not normally received, a transmission module, not shown in figures, for suitably receiving the packet from the access point 30 and transmitting the negative acknowledgement to the access point 30, and a decoding block, not shown in figures, for suitably decoding the restoration packet delivered from the access point 30.

In certain preferred embodiments, a packet of the invention is a code packet. The term "code packet" as used herein is meant to refer to a downlink packet containing a pre-numbering code. In certain particular embodiments, if the pre-numbering code is 1, the code packet is preferably referred as to 'X1', and if the pre-numbering code is 2, the code packet is preferably referred to as 'X2'. If the pre-numbering code is N, the code packet is preferably referred to as 'XN'. In other exemplary embodiments, a negative acknowledgement is referred as to 'NAK'.

According to preferred embodiments of the present invention as described herein, in the communication system 100 in a wireless network, an exemplary communication method using a code packet is described.

Figure 3:
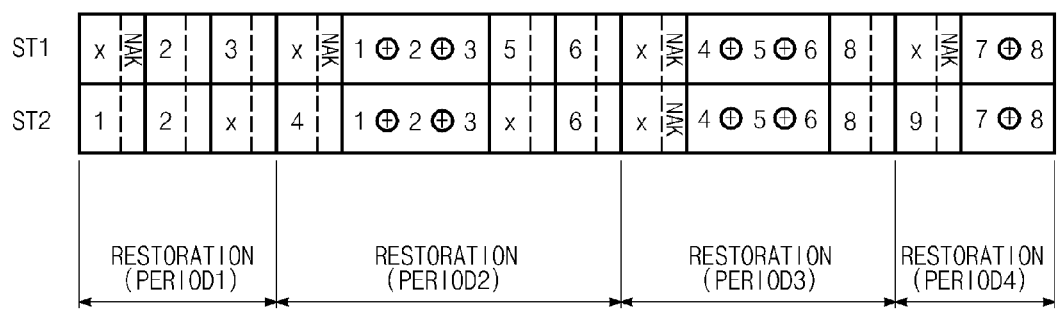
FIG. 3 is a sequence chart for showing an exemplary network coding packet communication system in a wireless network according to an embodiment of the present invention.

According to certain preferred embodiments and as shown in FIG. 3, FIG. 3 is a sequence chart for showing a code packet communication system in a wireless network according to an exemplary embodiment of the present invention.

According to certain preferred embodiments, a communication rule of the invention is summarized as follows.

Preferably, there are the first mobile terminal ST1 (symbol number '10' in FIG. 2) or the second mobile terminal ST2 (symbol number '20' in FIG. 2). In certain exemplary embodiments, if the first mobile terminal ST1 transmits a first negative acknowledgement to the access point 30, the second mobile terminal ST2 does not transmit a first negative acknowledgement to the access point 30. In other exemplary embodiments, if a second negative acknowledgement occurs after the first negative acknowledgement, the second mobile terminal ST2 preferably transmits a second negative acknowledgement to the access point 30. Preferably, the first mobile terminal ST1 generates a second negative acknowledgement, the first mobile terminal ST1 transmits the second negative acknowledgement to the access point 30. In certain preferred embodiments, only one of first negative acknowledgements individually generated by the first and second mobile terminals ST1 and ST2 is suitably delivered to the access point 30, but all of second negative acknowledgements independently generated by the first and second mobile terminal ST1 and ST2 should be transmitted to the access point 30.

In certain preferred embodiments and referring to FIG. 3, for example, the access point 30 transmits plural code packets, i.e., X1, X2, X3, . . . , and XN, to the first and second mobile terminals ST1 and ST2 sequentially.

Preferably, the control block of the first mobile terminal 10 generates NAK responsive to X1 if X1 is not normally received from the access point 30. In further preferred embodiments, the control block of the first mobile terminal 10 checks a history of whether another mobile terminal such as the second mobile terminal 20 transmits NAK to the access point 30 until present time. In further preferred embodiments, it is presumed that, if another mobile terminal suitably transmits NAK, the access point 30 as well as the first mobile terminal 10 also receives the NAK.

In further exemplary embodiments, if the control block of the first mobile terminal 10 cannot suitably recognize the history so that the NAK responsive to X1 is considered as a first negative acknowledgement, preferably, the NAK responsive to X1 is delivered to the access point 30. At this time, the NAK responsive to X1 transmitted from the first mobile terminal 10 to the access point 30 is also delivered to the second mobile terminal 20. Further, preferably, the control block of the second mobile terminal 20 recognizes that the first mobile terminal 10 suitably transmits an initial NAK to the access point 30.

In further preferred embodiments, the first mobile terminal 10 normally receives X2 and X3 from the access point 30, but does not normally receive X4 like X1. Further, the second mobile terminal 20 normally receives X1, X2 and X4 from the access point 30, but does not normally receive X3. Preferably, if X2 is received without X1 by a checksum test, the control block of the first mobile terminal 10 suitably recognizes that X1 is not received normally.

Preferably, since the first mobile terminal 10 does not receive X4 normally, NAK responsive to X4 is suitably generated. Preferably, the NAK responsive to X4 is a second NAK of the first mobile terminal 10 so that the first mobile terminal 10 transmits the NAK responsive to X4 to the access point 30.

According to further embodiments of the present invention, the second mobile terminal 20 does not normally receive X3 from the access point 30 to transmit NAK responsive to X3. Further, the second mobile terminal 20 checks a history of whether another mobile terminal including the first mobile terminal 10 suitably transmits NAK to the access point 30 until present time. However, because the first mobile terminal already transmitted NAK to the access point 30, the second mobile terminal 20 is not required to suitably transmit the NAK responsive to X3. As a result, in further preferred embodiments, if checking that another mobile terminal transmitted NAK to the access point 30, the second mobile terminal 20 can suitably omit to perform an operation for generating the NAK responsive to X3. Preferably, if, after X3, the second mobile terminal 20 does not suitably receive X4 normally so that NAK responsive to X4 is suitably generated, the second mobile terminal 20 should transmit the NAK responsive to X4 because the NAK responsive to X4 is a second NAK of the second mobile terminal 20.

Accordingly, in preferred embodiments of the present invention, after NAK responsive to a multicast packet is suitably generated and transmitted from one of the mobile terminals, other mobile terminals are not required to transmit a first NAK generated from them to the access point 30. Preferably, other mobile terminals transmit a second or later NAK to the access point 30. Accordingly, other mobile terminals do not perform an operation for generating the first NAK.

In further preferred embodiments, if the access point 30 suitably receives NAK responsive to X4 from the first mobile terminal 10, the NAK responsive to X4 is a second NAK suitably delivered from the first mobile terminal 10 because NAK responsive to X1 was previously delivered from the first mobile terminal 10. Preferably, the access point 30 sets an initial packet, i.e., X1 which is a first packet suitably transmitted to both the first and second mobile terminals, to X3, i.e., a previous packet of X4 in response to the second negative acknowledgement, i.e., the NAK responsive to X4 as a first restoration period. Further, after X4, the access point 30 set as a second restoration period. Preferably, since the access point 30 set X4 as an initial packet of the second restoration period, NAK responsive to X4 generated from the first mobile terminal 10 is a first NAK of the second restoration period. Preferably, the access point 30 suitably generates a restoration packet such as (X1⊕X2⊕X3) based on all packets X1, X2 and X3 in the first restoration period to transmit both the first and second mobile terminals 10 and 20 at a time.

According to further preferred embodiments of the present invention, although the second mobile terminal 20 suitably receives X3 normally, the access point 30 transmits the restoration packet to the second mobile terminal 20. In preferred embodiments of the present invention, the communication rule preferably says that the access point 30 cannot receive a first NAK of the second mobile terminal 20 if the first mobile terminal 10 previously transmitted a first NAK of the first mobile terminal 10 before the first NAK of the second mobile terminal 20. Accordingly, in certain preferred embodiments, even though the access point 30 does not receive any NAK of the second mobile terminal 20, a first NAK of the second mobile terminal 20 responsive to one of X1 to X3 can be occurred. Further, if there is no NAK of the second mobile terminal 20, the restoration packet is not suitably required to the second mobile terminal 20. However, in other preferred embodiments, if there is a first NAK, the restoration packet preferably provides a restoration source to the second mobile terminal 20. Thus, regardless of a first NAK of the second mobile terminal 20, the restoration packet is suitably delivered to the second mobile terminal 20.

Preferably, the control block of the first mobile terminal 10 enables the decoding block to perform a logic operation such as (X1⊕X2⊕X3)⊕(X2⊕X3), i.e., a logic XOR operation to the restoration packet and X2 and X3 previously received from the access point 30 in order to extract and recover X1 not received previously.

Preferably, the control block of the first mobile terminal 20 enables the decoding block to perform a logic operation such as $(X1 \oplus X2 \oplus X3) \oplus (X1 \oplus X2)$, i.e., a logic XOR operation to the restoration packet and X1 and X2 previously received from the access point 30 in order to extract and recover X3 not received previously.

Accordingly, in certain preferred embodiments, the first and second mobile terminal 10 and 20 recognize two information based on the restoration packet including $(X1 \oplus X2 \oplus X3)$ delivered from the access point 30. One is that the first restoration period is from X1 to X3. The other is that X4 is an initial packet of the second restoration period and the NAK responsive to X4 is a first NAK of the second restoration period.

Preferably, in the second restoration period, the first mobile terminal 10 suitably receives X5 and X6 normally and does not receive X7 normally. Further, the first mobile terminal 10 suitably generates NAK responsive to X7. Accordingly, the NAK responsive to X7 is a second NAK of the first mobile terminal 10 so that the NAK responsive to X7 suitably satisfies a transmission condition in the communication rule. Further, the second mobile terminal 20 does not suitably receive X5 to transmit NAK responsive to X5 to the access point 30, but recognizes that the NAK responsive to X4 is previously delivered to the access point 30 from the first mobile terminal 10 so that the NAK responsive to X4 is not generated. Further, the second mobile terminal 20 suitably receives X6 and does not receive X7. NAK responsive to X7 is generated by the second mobile terminal 20. Preferably, since the NAK responsive to X7 is a second NAK of the second mobile terminal 20, the NAK responsive to X7 satisfies the transmission condition in the communication rule.

According to certain preferred embodiments of the present invention, the first and second mobile terminals 10 and 20 independently generate NAKs responsive to X7 including the same pre-numbering code. Preferably, the NAKs responsive to X7 satisfy the transmission condition in the communication rule. However, according to random transmission times individually set up in the first and second mobile terminals 10 and 20, either the first mobile terminal 10 or the second mobile terminal 20 transmits the NAK responsive to X7 to the access point 30. Preferably, the random transmission time is individually and separately set up in each mobile terminal. For example, in certain preferred embodiments, the first mobile terminal 10 is set to transmit a NAK to the access point 30 after 7 ms from a timing of recognizing a failure of receiving a multicast packet, and the second mobile terminal 20 is set to transmit a NAK to the access point 30 after 5 ms from a timing of recognizing a failure of receiving a multicast packet. For example, if the second mobile terminal 20 suitably transmits NAK responsive to X7 after 5 ms, the first mobile terminal 10 does not transmit NAK responsive to X7 because the NAK responsive to X7 is received from the second mobile terminal 20. According to certain preferred embodiments, for example as shown in FIG. 3, the NAK responsive to X7 generated from the first mobile terminal 10 looks blurred. Preferably, the random transmission time can be newly set at every time when NAK is transmitted.

In further preferred embodiments, if the access point 30 suitably receives the NAK responsive to X7 from the second mobile terminal 20, the access point 30 receives a second NAK, from one of mobile terminals. For example, as shown in FIG. 3, the access point 30 suitably receives NAKs responsive to X5 and X7 from the second mobile terminal 20. Accordingly, the access point 30 suitably sets X4 to X6, which is a previous packet of X7 corresponding to the second NAK, as a second restoration period and X7 and next packets as a third restoration period. Preferably, the NAK responsive to X7 is a first NAK of the third restoration period because the access point 30 sets X7 as an initial packet in the third restoration period. In further preferred embodiments, the access point 30 suitably generates a restoration packet such as $(X4 \oplus X5 \oplus X6)$ based on all packets X4, X5 and X6 in the second restoration period to transmit both the first and second mobile terminals 10 and 20.

According to further preferred embodiments of the present invention, the control block of the first mobile terminal 10 enables the decoding block to perform a logic operation such as $(X4 \oplus X5 \oplus X6) \oplus (X5 \oplus X6)$, i.e., a logic XOR operation to the restoration packet and X5 and X6 previously received from the access point 30 in order to extract and recover X4 not received previously.

Preferably, the control block of the first mobile terminal 20 suitably enables the decoding block to perform a logic operation such as $(X4 \oplus X5 \oplus X6) \oplus (X4 \oplus X6)$, i.e., a logic XOR operation to the restoration packet and X4 and X6 previously received from the access point 30 in order to extract and recover X5 not received previously.

According to another preferred embodiment, in the third restoration period, the first mobile terminal 10 suitably receives X8 normally and does not receive X9 normally. Accordingly, the first mobile terminal 10 suitably generates NAK responsive to X9. Preferably, although the NAK responsive to X7 generated from the first mobile terminal 10 is not suitably transmitted to the access point 30, the NAK responsive to X9 is a second NAK of the first mobile terminal 10 so that the NAK responsive to X9 is transmitted to the access point 30.

Preferably, if the access point 30 suitably receives NAK responsive to X9 from the first mobile terminal 10, the access point 30 preferably considers the NAK responsive to X9 as a second NAK delivered from the first mobile terminal 10 because of the communication rule. Preferably, the NAK responsive to X7 was previously generated but not delivered from the first mobile terminal 10. In further preferred embodiments, under the communication rule, when the second mobile terminal 20 suitably transmits a first NAK to the access point 30, the first mobile terminal 10 preferably transmits a second NAK without a first NAK to the access point 30. Preferably, if the access point 30 suitably receives the NAK responsive to X9 from the first mobile terminal 10, the access point 30 recognizes that a previous NAK before the NAK responsive to X9 is not delivered from the first mobile terminal 10 and can determine the NAK responsive to X9 from the first mobile terminal 10 as the second NAK of the first mobile terminal 20. Accordingly, in preferred embodiments, the access point 30 suitably recognizes two NAKs occurred from one of mobile terminals in one restoration period. Preferably, the access point 30 sets an initial packet, i.e., X7, to X8, i.e., a previous packet of X9 corresponding to the second NAK of the first mobile terminal 20. Also, after X9, the access point 30 set as a fourth restoration period. Preferably, since the access point 30 set X9 as an initial packet of the fourth restoration period, NAK responsive to X9 generated from the first mobile terminal 10 is a first NAK of the fourth restoration period. Preferably, the access point 30 suitably generates a restoration packet such as $(X7 \oplus X8)$ based on all packets X7 and X8 in the third restoration period to transmit both the first and second mobile terminals 10 and 20.

In certain exemplary embodiments, the control block of the first mobile terminal 10 preferably enables the decoding block to perform a logic operation such as $((X7 \oplus X8) \oplus X8)$, i.e., a logic XOR operation to the restoration packet and X8 previously received from the access point 30 in order to extract and recover X7 not received previously.

In other certain exemplary embodiments, the control block of the first mobile terminal 20 preferably enables the decoding block to perform a logic operation such as $((X7 \oplus X8) \oplus 8)$, i.e., a logic XOR operation to the restoration packet and X8 previously received from the access point 30 in order to extract and recover X7 not received previously.

According to other preferred embodiments of the present invention, if the access point 30 does not receive a second NAK from one mobile terminal until a predetermined number of packets in a predetermined restoration period, the access point 30 generates a restoration packet based on all predetermined restoration periods after the predetermined number of packets is transmitted. For example, in certain preferred embodiments, if the number of packet is 6 in the fourth restoration period where the initial packet is X9, the access point 30 generates a restoration packet based on X9 to X14, which is a previous packet of X15 being the sixth packet from the initial packet.

Figure 4:
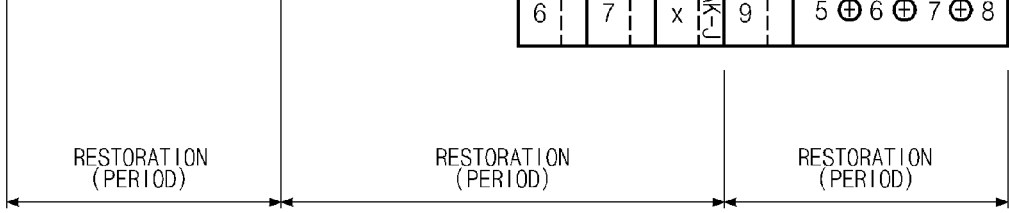
FIG. 4 is a sequence chart for showing an exemplary network coding packet communication system in a wireless network according to another embodiment of the present invention.

FIG. 4 is a sequence chart for showing a code packet communication system 100 in a wireless network according to another preferred embodiment of the present invention.

In certain exemplary embodiments, for example as shown in FIG. 4, a third mobile terminal ST3 preferably intervenes in a second restoration period when the first and second mobile terminals ST1 and ST2 are suitably communicated with the access point 30. Preferably, the third mobile terminal ST3 cannot suitably recognize a first NAK of the second restoration period, which is transmitted previously before the third mobile terminal ST3 intervenes. Accordingly, if the third mobile terminal ST3 suitably generates a first NAK after intervening any restoration period, the third mobile terminal ST3 inserts an additional identifier, e.g., JOIN, to the first NAK and transmits the first NAK containing the additional identifier to the access point 30. Herein, the additional identifier prevents that the access point recognizes NAK delivered from newly joined mobile terminal ST3 as a second NAK of the newly joined mobile terminal ST3.

In certain exemplary embodiments, referring to FIGS. 3 and 4, for example, when first and second NAKs are transmitted from a single mobile terminal, the access point 30 of the invention suitably separates the first NAK and the second NAK into different restoration periods. Accordingly, in further preferred embodiments, in a single restoration period, the access point 30 preferably allows only one or less NAK to each mobile terminal.

For example, in certain preferred embodiments, logic operations such as $((A \oplus B) \oplus B) = A$ and $(A \oplus B \oplus C) \oplus (B \oplus C) = A$ are possible. Preferably, if only one 'A' among them 'A, B' or 'A, B, C' is missed or lost, the one 'A' can be suitably extracted or recovered via the logic operation based on others 'B' or 'B, C' among them. However, if two among them is missed or lost, two cannot be suitably extracted or recovered via logic operation. Accordingly, if any mobile terminal transmits first and second NAK, the access point 30 sets the second NAK as a NAK of another restoration period, not present restoration period. Preferably, the access point 30 suitably generates a restoration packet based on an initial packet of the present restoration period to a previous packet of a multicast packet corresponding to the second NAK.

Accordingly, as described herein, in a code packet communication system in a wireless network according to preferred embodiments as described herein, after NAK responsive to a multicast packet is suitably generated and transmitted from one of the mobile terminals, other mobile terminals are preferably not required to transmit a first NAK generated from them to the access point. Preferably, then, other mobile terminals suitably transmit a second or later NAK to the access point. Accordingly, preferably, occurrence of NAKs between a access point and plural mobile terminals is suitably reduced so that obstacle or problem such as a collision between NAKs can be reduced and a bandwidth in a wireless network can increase.

In case of more than one mobile terminal in addition to the first and the second mobile terminals, In case that a terminal transmitting the first negative acknowledgement or both the first negative acknowledgement and the second negative acknowledgement refers to the first mobile terminal, In case that another terminal not transmitting the first negative acknowledgement but transmitting the second negative acknowledgement refers to the second mobile terminal.

In further preferred embodiments, the access point in the wireless network is not required to always store the negative acknowledgement delivered from all mobile terminals so that a communication process can be suitably simplified.

In other further embodiments, in a code packet communication system in a wireless network, after NAKs responsive to a multicast packet is suitably generated and transmitted from plural mobile terminals, only one mobile terminal suitably transmits the NAK to the access point according to random transmission times individually set up in each mobile terminal. Accordingly, one mobile terminal instead of plural mobile terminal suitably transmits the NAK so that the number of NAKs actually transmitted via a wireless network decreases. Accordingly, in certain preferred embodiments, occurrence of NAKs between a access point and plural mobile terminals is suitably reduced so that obstacle or problem such as a collision between NAKs can be reduced and a bandwidth in a wireless network can increase.

It will be apparent to those skilled in the art that various modifications and variation can be made in the present invention without departing from the spirit or scope of the invention. Thus, it is intended that the present invention cover the modifications and variations of this invention, provided they come within the scope of the appended claims and their equivalents.

What is claimed is:

1. A communication method using a code packet in a wireless network, comprising:
    (a) transmitting packets having serial numbers to a first mobile terminal and a second mobile terminal;
    (b) receiving a first negative acknowledgement (NAK) of the first mobile terminal from the first mobile terminal;
    (c) receiving a second NAK of the first mobile terminal or a second NAK of the second mobile terminal, without receiving a first NAK of the second mobile terminal generated when the second mobile terminal does not receive the packet for the first time and generated after the first NAK of the first mobile terminal; and
    (d) transmitting a restoration packet to the first and second mobile terminals;
    an (e) step after the d step, setting restoration period,
    wherein the restoration period includes a first restoration period that defined with serial numbers of multicast packets prior to a multicast packet corresponding to the second NAK received in the (c)step and a second restoration period that defined with serial numbers of multicast packets after the multicast packet corresponding to the second NAK received in the (c) step, and the second NAK received in the (c) step recognizes is set up as an initial NAK of the second restoration period.

2. The communication method according to claim 1, further comprising:
in case that the (c) step is not performed until a predetermined number of multicast packets are transmitted after the (b) step,
a step (d-1) transmitting the restoration packet generated in reference to serial numbers of the predetermined number of multicast packets to the first mobile terminal and second mobile terminal.

3. The communication method according to claim 1, wherein in the (b) or (c) step,
when both the first mobile terminal and second mobile terminal do not receive a multicast packet normally, receiving a NAK responsive to the multicast packet error from one of the first mobile terminal and second mobile terminal after a random transmission delay set up in the first mobile terminal and second mobile terminal.

4. The communication method according to claim 1, wherein, when a third mobile terminal in addition to the first and second mobile terminal joins in a multicast restoration period, the third mobile terminal adds an identifier to a NAK and transmitting the NAK containing an identifier to a access point when the NAK is initially occurred after the third mobile terminal joins.

5. The communication method of claim 1, wherein the restoration packet is generated using network coding methods of exclusive OR operations of all multicast packets that belong to a restoration period.

* * * * *